2,862,969
Patented Dec. 2, 1958

2,862,969

PROCESS FOR THE PRODUCTION OF DIBENZYL ETHYLENEDIAMINE

George Parker, Gateacre, Liverpool, England, assignor to The Distillers Company Limited, Edinburgh, Scotland, a British company No Drawing. Application August 19, 1954
Serial No. 451,070

Claims priority, application Great Britain August 25, 1953

4 Claims. (Cl. 260—570.9)

The present invention relates to an improved process for the production of dibenzyl ethylenediamine which is an important intermediate used in the production of dibenzyl ethylenediamine dipenicillin.

It is known that dibenzyl ethylenediamine may be prepared by the hydrogenation of dibenzylidene ethylenediamine in presence of platinum as catalyst. However, this reaction leaves something to be desired in that the efficiency of the reaction is not high and the yields are correspondingly low. It is, therefore, a desideratum in the art to embody a mode of carrying out such reaction with improved yields and great efficiency.

A primary object of the present invention, therefore, is the satisfaction of such desideratum by the embodiment of a process for the catalytic hydrogenation of dibenzylidene ethylenediamine to produce dibenzyl ethylenediamine. This object is realized according to the present invention, briefly stated, by the expedient of carrying out the hydrogenation in the presence of a supported palladium catalyst. Unexpectedly and unforeseeably, the yields achieved with the present invention are of the order of 80% (of the theoretical) whereas according to the aforesaid known process the yields are much lower (70% of the theoretical or less). Moreover, the life of the palladium catalyst is unexpectedly much longer than that of the platinum catalyst.

Accordingly, the present invention is for a process for the production of dibenzyl ethylenediamine which comprises hydrogenating dibenzylidene ethylenediamine in the presence of a supported palladium catalyst.

The hydrogenation may be carried out at normal pressure or at elevated pressures, and at normal or elevated temperatures. It has been found suitable to use pressures of about 0–300 pounds per square inch, although higher pressures may be used if desired, and to maintain the temperature of the reaction between about 20° C. and about 45° C. The hydrogenation is suitably carried out in an inert diluent, such as for example, methanol or ethanol, although any other inert, and preferably low boiling, diluent which is a solvent for the starting material can be used. Vigorous agitation of the reaction mixture is beneficial.

The supported palladium catalyst may comprise palladium, in a subdivided form, supported on alumina, charcoal or like catalyst supports, such, for example, as a 5% by weight palladium-on-alumina catalyst. The amount of catalyst employed is suitably sufficient to give about 0.25–1.0% of palladium by weight of the dibenzylidene ethylenediamine employed. The catalyst, if so desired, may be reused in the hydrogenation process.

The hydrogenation product, in addition to dibenzyl ethylenediamine, contains some 1:3-dibenzyl-tetrahydroimidazole, which is converted to dibenzyl ethylenediamine by acid hydrolysis, with the liberation of benzaldehyde. Accordingly, the reaction product is suitably subjected to acid hydrolysis, as with sulphuric acid, acetic acid or other acids, the liberated benzaldehyde removed, and the formed dibenzyl ethylenediamine recovered.

If so desired the dibenzyl ethylenediamine salt thus obtained may be treated with alkali to liberate the free base, which may be extracted into an organic solvent such as butyl acetate, treated, if desired, with decolourising carbon, and the extract treated with whichever acid corresponds to the salt of dibenzyl ethylenediamine it is desired to produce.

The following examples are given to illustrate the process of the present invention. Percentages, unless otherwise indicated, are percentages by weight.

EXAMPLE 1

4.5 kilograms of a 5% pallidium-on-alumina catalyst are slurried in 4.5 litres of methanol, and the slurry introduced into the hydrogenation reactor, followed by 45.5 kilograms of dibenzylidene ethylenediamine in 180 litres of methanol. The reaction mixture is agitated and hydrogen introduced at a pressure of 3.4 atmospheres, the reactor being cooled in order to maintain the reaction temperature between about 30° and 45° C. When hydrogen absorption ceases, the mixture is heated to 60° C. for 15 minutes, and then filtered hot. The filtrate is then distilled under vacuum to remove the methanol, and the residue treated with 10% by volume sulphuric acid to pH 2 and boiled for 30 minutes. The product is cooled, whereupon the dibenzyl ethylenediamine sulphate crystallises out. The crystalline material is separated and washel with butyl acetate to remove any benzaldehyde present, giving crystalline dibenzyl ethylenediamine sulphate.

This sulphate is basified to pH 10 with 20% aqueous sodium hydroxide solution, the free base extracted into butyl acetate, the extract treated with 0.5% of decolourising carbon, the carbon filtered off, and the filtrate dried, and then treated with glacial acetic acid to pH 4.5, precipitating the dibenzyl ethylenediamine diacetate. This salt crystallises by heating the mixture to 60° C. to dissolve the acetate, and then cooling slowly to 5° C.

Substantially the same results are obtained if the hydrogenation is carried out in other inert solvents such as, for instance, ethanol.

EXAMPLE 2

5 kilograms of a 5% palladium-on-alumina catalyst is slurried in 5 litres of methanol, and the slurry introduced into the hydrogenation reactor with 50 kilograms of dibenzylidene ethylenediamine in 200 litres of methanol. The reaction mixture is agitated and hydrogen introduced at a pressure of 3.4 atmospheres, the reactor being cooled to maintain the reaction temperature between about 30° and 45° C. When hydrogen absorption ceases, the mixture is heated to 60° C. for 15 minutes, and then filtered hot. The filtrate is then distilled under vacuum to remove the methanol, and the residue treated with glacial acetic acid to pH 3 and boiled for 30 minutes. On cooling the dibenzyl ethylenediamine diacetate crystallises out from this solution and is separated by filtration.

Replacement of the palladium-on-alumina catalyst by a palladium-on-charcoal catalyst also enables dibenzyl ethylenediamine to be obtained as the diacetate in satisfactory yield.

EXAMPLE 3

Dibenzylidene ethylenediamine (50 parts by weight) in methanol (200 parts by volume) is treated with 5% palladium-on-alumina (5 parts by weight) in a closed stainless steel reaction vessel containing hydrogen at 50 pounds per square inch gauge for 3 hours. The mixture is agitated throughout the hydrogenation. The reaction mixture is then heated to 60° C., filtered to remove catalyst, and distilled to remove methanol. The residue is treated with sulphuric acid (150 parts by volume, 10% by volume) and heated under reflux for 20 minutes, cooled and stirred with ether (150 parts by volume) for 10 minutes. The precipitated dibenzyl ethylenediamine sulphate is filtered, washed with ether and dried. Table 1 gives the results of some typical runs, including experiments to confirm the feasibility of using a single sample of catalyst for the hydrogenation of several lots of dibenzylidene ethylenediamine, under the above conditions.

Table 1

| Run No. | Number of usages of catalyst | DBED sulphate | | |
|---|---|---|---|---|
| | | Yield, p. b. w. | Moisture (percent) | Purity (percent) |
| 1 | One | 59.7 | 0.33 | 93.2 |
| 2 | One | 59.2 | 0.29 | 92.5 |
| 3 | First usage | 58.5 | 0.52 | 89.0 |
| 4 | Second usage | 59.0 | 0.29 | 95.7 |
| 5 | Third usage | 63.4 | 0.61 | 93.1 |
| 6 | Fourth usage | 49.4 | 0.41 | 92.3 |

Replacement of the palladium by a 5% platinum-on-alumina catalyst gave the following yields. Other quantities and conditions were as described above.

Table 2

| Run No. | Conditions of reaction | Number of usages of catalyst | DBED sulphate | | |
|---|---|---|---|---|---|
| | | | Yield, p. b. w. | Moisture (percent) | Purity (percent) |
| 1 | Standard (as described in text). | One | 15.5 | 0.47 | 92.4 |
| 2 | ---do--- | One | 29.6 | 0.68 | 87.6 |
| 3 | ---do--- | First usage | 18.5 | 0.50 | 92.6 |
| 4 | ---do--- | Second usage | 5.7 | 0.71 | 13.4 |
| 5 | Hydrogenated for 6 hrs. with 10 parts by weight catalyst. | One | 42.0 | 0.54 | 91.3 |

EXAMPLE 4

224 lbs. dibenzylidene ethylenediamine in 130 gallons methanol were treated with 10 kilos 5% palladium-on-alumina in a closed vessel. The mixture was evacuated, flushed with nitrogen and re-evacuated. Vigorous agitation was commenced, and hydrogen gas bled into the system to maintain the pressure at 0 p. s. i. g. The temperature was maintained at 28° C. When no further uptake occurred at this pressure, the pressure was raised to 35 p. s. i. g. at 30 minutes but practically no further absorption occurred. The reaction mixture was then worked up essentially as described in Example 1, except that the benzaldehyde liberated by acid hydrolysis was removed by distillation in vacuum. It was then not necessary to isolate dibenzyl ethylenediamine sulphate: instead the reaction mixture was basified and the dibenzyl ethylenediamine removed by extraction with butyl acetate.

Yield of dibenzyl ethylenediamine diacetate: 250 lbs.

I claim:

1. A process for the production of dibenzyl ethylenediamine, which comprises hydrogenating dibenzylidene ethylenediamine with hydrogen in an inert solvent at a pressure in the range 0 to 300 pounds per square inch gauge at a temperature between 20° and 45° C. in the presence of a palladium-on-alumina present in an amount between 0.25% and 1% by weight of palladium with respect to the dibenzylidene ethylenediamine initially present.

2. A process which comprises hydrogenating dibenzylidene ethylenediamine in methanol solution in the presence of a palladium-on-alumina catalyst under a hydrogen pressure of about 50 pounds per square inch and at a temperature between 30° and 45° C., heating the resulting mixture to about 60° C. and filtering off the catalyst, removing the methanol under vacuum, treating the resulting product with boiling dilute sulphuric acid and recovering dibenzyl ethylenediamine as the crystalline sulphate.

3. A process according to claim 2, wherein the dibenzylidene ethylenediamine is hydrogenated batchwise, the filtered-off catalyst from the first batch being directly employed as the catalyst for the successive batch.

4. A process which comprises hydrogenating dibenzylidene ethylenediamine in methanol solution with vigorous agitation in the presence of a palladium-on-alumina catalyst at atmospheric pressure and at a temperature between 30° and 45° C., heating the resulting mixture to about 60° C. and filtering off the catalyst, removing the methanol under vacuum, treating the resulting product with boiling dilute sulphuric acid and recovering dibenzyl ethylenediamine as the crystalline sulphate.

References Cited in the file of this patent

UNITED STATES PATENTS 2,582,292 Sondern et al. _____ Jan. 15, 1952
2,627,491 Szabo et al. _____ Feb. 3, 1953

OTHER REFERENCES

Lob: Chem. Abst. (1937), vol. 31, page 1385.
Groggins: Unit Processes in Organic Synthesis (1947), 3rd ed., page 527.
Adams et al.: Organic Reactions (1948), vol. IV, page 212.
Szabo et al.: "Antibiotics and Chemotherapy" (1951), vol. 1, pages 499–503.